United States Patent
Marsden

(10) Patent No.: US 6,212,678 B1
(45) Date of Patent: Apr. 3, 2001

(54) METHOD OF CARRYING OUT COMPUTER OPERATIONS

(75) Inventor: Simon David Marsden, London (GB)

(73) Assignee: Microapl Limited (GB)

( * ) Notice: Subject to any disclaimer, the term of this patent is extended or adjusted under 35 U.S.C. 154(b) by 0 days.

(21) Appl. No.: 09/123,375

(22) Filed: Jul. 27, 1998

(30) Foreign Application Priority Data

Jul. 28, 1997 (GB) .................................... 9715887

(51) Int. Cl.[7] ...................................................... G06F 9/45
(52) U.S. Cl. ...................................... 717/9; 717/1
(58) Field of Search .................................... 395/709, 701, 395/406; 709/1, 100, 106; 711/132; 712/212; 713/200; 364/300; 717/9, 1

(56) References Cited

U.S. PATENT DOCUMENTS

| | | | |
|---|---|---|---|
| 3,858,182 | * 12/1974 | Delagi et al. | 713/200 |
| 4,656,582 | * 4/1987 | Chaitin et al. | 717/7 |
| 5,077,654 | * 12/1991 | Ohtsuki | 709/100 |
| 5,361,375 | * 11/1994 | Ogi | 709/1 |
| 5,506,975 | * 4/1996 | Onodera | 709/1 |
| 5,692,193 | * 11/1997 | Jaganathan et al. | 709/106 |
| 5,925,123 | * 7/1999 | Tremblay et al. | 712/212 |
| 5,953,741 | * 9/1999 | Evoy et al. | 711/132 |
| 5,970,242 | * 10/1999 | O'Connor et al. | 717/1 |

OTHER PUBLICATIONS

Lindholm–Yellin, The Java Virtual Machine Specification, Addison–Wesley, pp. 2, 53–55, 61–64, 66–68, 79–81, Sep. 1996.*

* cited by examiner

*Primary Examiner*—Mark R. Powell
*Assistant Examiner*—Hoang-Vu Antony Nguyen-Ba
(74) *Attorney, Agent, or Firm*—Barnes & Thornburg

(57) ABSTRACT

A method and apparatus with carrying out computer operations of push and pop. The series of program sections including an interpretive program or module which interprets intermediate code are constructed to consider a series of registers as all or part of a stack for holding operands. Each program section is arranged and considered a different one of the series of registers to be at the top of the stack. The switching from one program section to another to perform the pushes and pops is performed as a function of the register that is at the top of the stack preferably without normally copying the data into the registers. The series of program sections may be ordered in the same sequence as the sequence of the registers that are considered to be at the top of the stack of the program sections.

22 Claims, 2 Drawing Sheets

Array of virtual machine tables.
Each virtual machine has its own table of handlers (or addresses of handlers), one for each possible pseudo-instruction code (in this case there are 256 possible codes and 8 virtual machines). Each handler assumes the first free stack element is in the register associated with the top of stack in that virtual machine. Switching between the virtual machines requires only changing a pointer to the base of the table.

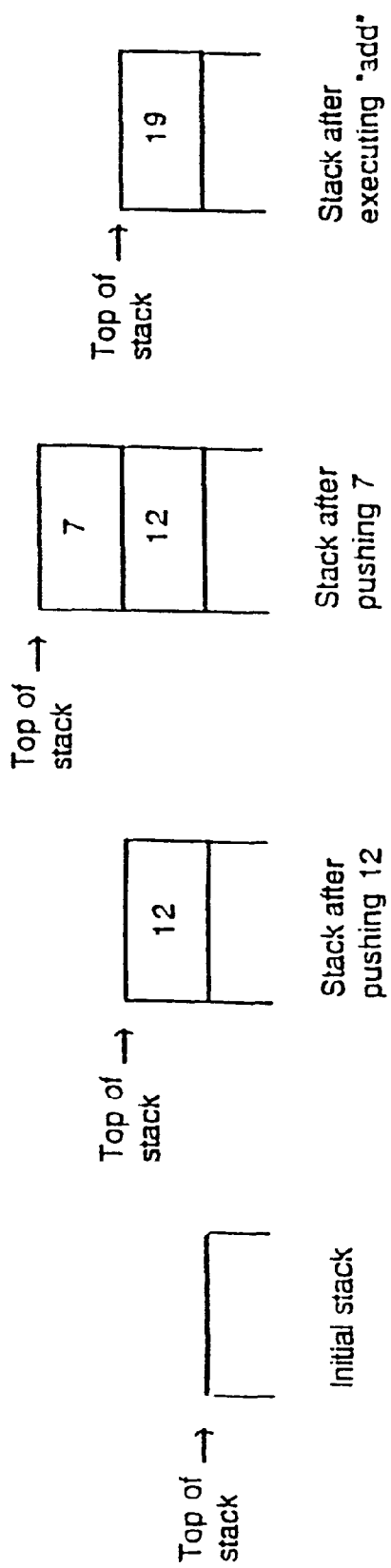
FIG.1: Adding 12 to 7 in a stack-based virtual machine

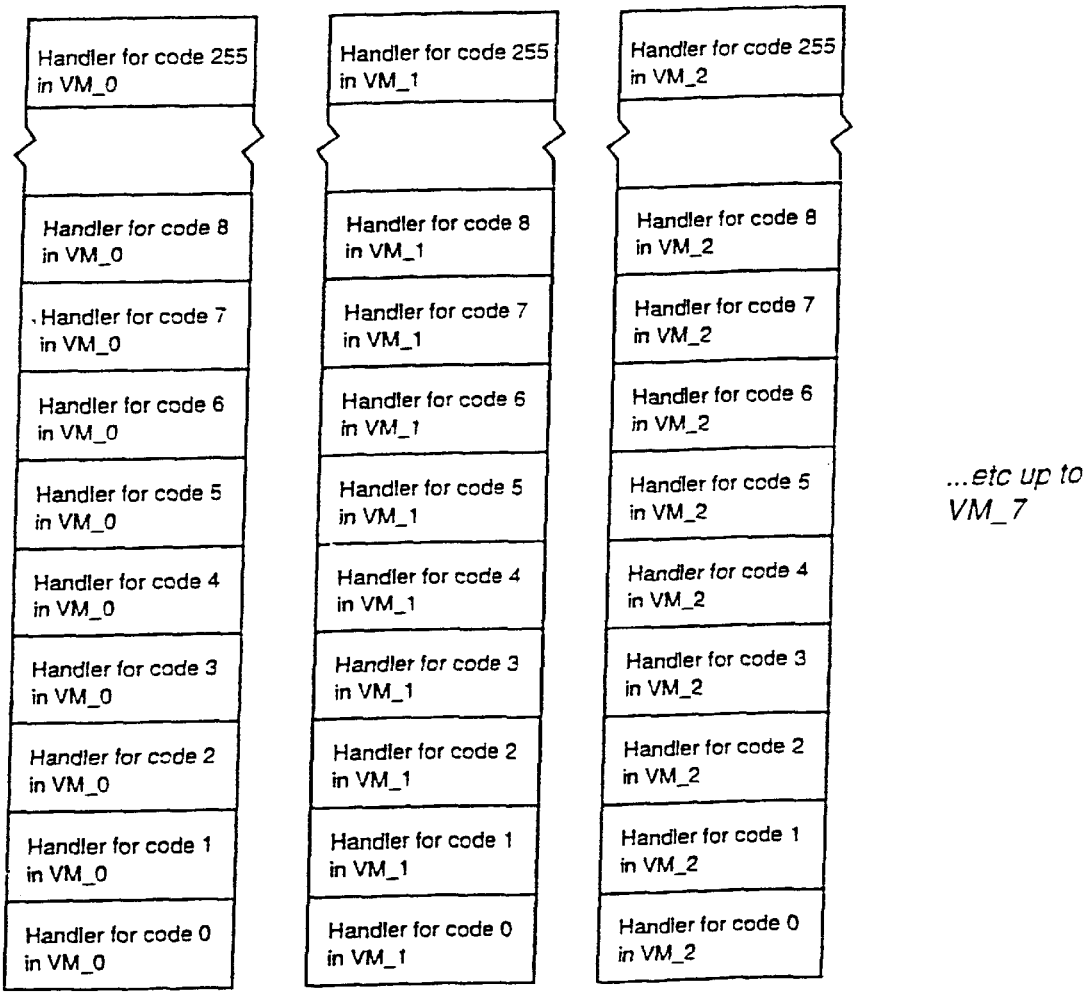

FIG.2:

*Array of virtual machine tables.*
Each virtual machine has its own table of handlers (or addresses of handlers), one for each possible pseudo-instruction code (in this case there are 256 possible codes and 8 virtual machines). Each handler assumes the first free stack element is in the register associated with the top of stack in that virtual machine. Switching between the virtual machines requires only changing a pointer to the base of the table.

METHOD OF CARRYING OUT COMPUTER OPERATIONS

BACKGROUND AND SUMMARY OF THE INVENTION

The present invention relates to a method of carrying out stack based computer operations and to a computer for carrying out such operations.

Computer software is usually written in a high-level language such as C or Pascal, and compiled into the object code of the particular computer processor on which it will be executed. In some cases, however, code is compiled into an intermediate representation (intermediate code), sometimes referred to as 'Pseudo-Code' or 'P-Code', which is independent of any particular processor architecture. This intermediate code is then interpreted by a program (known as a Virtual Machine), which runs on the target processor. A well-known example of such a system is the Java™ language and intermediate representation, where the high level source code is compiled into one-byte virtual instructions (some of which have further operand bytes), which can then be interpreted by a Java Byte Code interpreter. For more efficient execution, a variant of this scheme involves a 'Just-In-Time Compiler', which translates sequences of pseudo-code into real machine code just before executing it.

It is common for the intermediate representation to be defined in terms of a stack-based architecture for the data which is being manipulated. In such a system, of which Java Byte Code is an example, all arithmetic operations act on the operands currently at the top of the stack. For example, to add two numbers together, the following steps would be taken:

1. Push the first number on to the stack.
2. Push the second number on to the stack (just above the first number).
3. Execute the 'add' instruction, which pops the top two elements from the stack, adds them together, and pushes the result back on to the stack.

This is illustrated, for the case where the first number is 12 and the second number is 7, in FIG. 1. The stack is usually implemented in memory, with a processor register acting as a stack pointer and pointing at the current top of the stack. Pushing an element on to the stack then involves writing a value to the memory location pointed to by the stack pointer, and incrementing the stack pointer (assuming an upwards-growing stack). Popping an element from the stack involves decrementing the stack pointer (again assuming an upwards-growing stack), and reading the element then pointed to by the stack pointer.

Although such a virtual machine can easily be implemented using any standard computer processor, it has a major disadvantage for modern high-performance processor architectures commonly known as Reduced Instruction Set Computers (RISC). These processors are designed to take advantage of the fact that operations on registers can be executed much more quickly than operations which need to read and write data from relatively slow main memory. They thus have many registers (typically 32), and their instruction sets are optimised for executing code which is able to keep data in registers as much as possible. This conflicts with the stack-based pseudo-code architecture described above, which is based on the assumption that data will be addressable in memory in a stack form.

Although it is possible to design a simple scheme whereby, by convention, the first few elements of the stack are held in registers, such a scheme if implemented with a fixed mapping of registers to stack position would be very inefficient. For example, consider a processor with 32 registers (denoted r0 to r31). The pseudo-code interpreter could easily be designed in such a way that eight of those registers were used to hold the first eight elements of the stack, with any further elements being spilled out to memory. For example, r24 might always represent the first or top element on the stack, r25 the second, and so on, up to r31 which would represent the eighth or bottom element. If the stack contained more than eight elements, the ninth and subsequent elements would have be held in memory. This would mean that code implementing the 'add' pseudo-instruction could then act directly on registers, since the top two elements of the stack would always be held in registers r24 and r25. However, such an implementation would not be practical, since in order to push a new element on to the stack, it would be necessary to copy the whole contents of the stack down one position in order to maintain the fixed mapping whereby r24 always represented the first element, and similarly to pop an element from the stack the whole stack would need to be copied up one position.

The present invention seeks to avoid this conflict and improve the performance of virtual machines interpreting stack-based pseudo-code by ensuring that data remains in registers as much as possible, without normally needing to copy data when pushing and popping elements.

According to a first aspect, the invention is a method of carrying out computer operations on a computer including a processor and a series of registers, the method comprising:

the construction of a series of program sections, each program sections comprising an interpreter program which runs on the processor and interprets intermediate code, each program sections constructed to consider the series of registers as all or part of a stack for holding operands and each program sections arranged to consider a different one of the series of registers to be at the top of the stack;

switching from one program sections to another whereby, when an operand is pushed by a virtual machine into the register which it considers to be at the top of the stack, a subsequent virtual machine in the series is selected which considers a different register to be at the top of the stack, and when an operand is popped by a program sections from the register which it considers to be at the top of the stack, a previous program sections in the series is selected which considers a different register to be at the top of the stack.

This invention can be implemented so as to operate very quickly but with the use of only a small amount of extra memory used in constructing the virtual machines. Known solutions are either very quick but use a lot of memory, or use little memory and are slow.

Normally, all of the virtual machines consider the series of registers to be in the same sequence, but each considers a different register to be at the top of the stack. Switching between virtual machines therefore has the effect of moving the stack up and down without having to copy the whole contents of the stack up or down the registers. Also, where more than one operand is pushed or popped, it would be normal to switch up and down the series of virtual machines by the same number of times as operands are pushed or popped. Thus, if two operands are pushed, the virtual machines are switched twice to the virtual machine two away from the original one.

In certain circumstances, the virtual machines are constructed to be identical in every respect, other than the register it considers to be at the top of the stack. The virtual machines are constructed by writing the intermediate code interpreter programs to the computer memory.

In a preferred embodiment, there are the same number of registers as virtual machines, and each virtual machine considers a different one of the registers to be at the top of the stack.

In some circumstances, more operands are pushed onto the stack than there are registers. If this occurs, the method of operation spills one or more of the operands from the stack into memory, and these operands may be retrieved later, if required. It is preferred to spill one or more of the operands at the bottom of the stack to memory since these are least likely to be used again immediately. It is also preferred to spill more than one operand to memory, and preferably between 25 and 50 percent of the operands held in the registers. This means that were the next operation of the computer to be to push another operand onto the stack, it will not have to spill operands to memory again straight away.

The interpreter can operate to convert all of the instructions into machine code before the computer runs, or immediately before an instruction is run, as in just-in-time compilers.

According to a second aspect of the invention, a computer comprises a processor; a series of registers; a series of program sections, each program sections including an interpreter program or module which runs on the processor to interpret intermediate code, each program sections being arranged to consider the series of registers as all or part of a stack for holding operands and to consider a different one of the series of registers to be at the top of the stack; and switching means for switching from one program sections to another whereby when an operand is pushed by a program sections into the register which it considers to be at the top of the stack, the subsequent program sections in series is selected by the switching means which considers a different register to be at the top of the stack, and when an operand is popped by a program sections from the register which it considers to be at the top of the stack, the previous machine in the series is selected by the switching means which considers a different register to be at the top of the stack.

Thus, the present invention achieves its aim by means of an array of program sections, each of which contains code which is correct for a different register representing the first stack element. When it is necessary to change the top-of-stack position in order to push or pop data onto or off the stack, this is achieved by switching to a different program sections instead of moving the data itself.

Other objects, advantages and novel features of the present invention will become apparent from the following detailed description of the invention when considered in conjunction with the accompanying drawings.

BRIEF DESCRIPTION OF THE DRAWINGS

Embodiments of the invention are described below by way of example, and with reference to FIG. 2. In the drawings:

FIG. 1 shows a stack during the operation of adding 12 and 7 in stack-based architecture, as used in the prior art; and FIG. 2 shows an array of program sections tables according to the present invention, each table forming the handlers for a program sections.

DETAILED DESCRIPTION OF THE PREFERRED EMBODIMENTS

FIG. 2 illustrates a design where there are N+1 virtual machines or programs sections, denoted VM_0 to VM_N. For each possible instruction defined for the pseudo-code, there would be N+1 sequences of real machine code (or N+1 table entries pointing to machine code), one for each virtual machine or program sections. For example, the 'add' instruction described above would exist in N+1 forms, denoted add_0 to add_N. The first N+1 elements of the stack would be held in registers, denoted rst0 to rstkn, corresponding to whatever real processor registers were convenient. For any given virtual machine or program sections, each of the first few elements on the stack is in a fixed set of registers, thus allowing the efficient implementation of each operation. The effect of pushing or popping data is achieved by leaving the data in position in the registers and incrementing or decrementing the currently active virtual machine or program sections number.

At the start of execution of the pseudo code, there would be no data on the stack. The current virtual machine would be set to VM_0. If one element were pushed on to the stack, it would be placed in register rstk0, because any routine within VM_0 which pushed the data would follow the convention that rstk0 was the next free position on the stack. The current virtual machine would then be set to VM_1, reflecting the fact that the stack position had changed by one element and that the next free position was therefore now rstk1. If another element were then pushed on to the stack, then the routine within VM_1 which pushed the data would place it in rstk1, and switch to VM_2. Within VM_2, routines which needed to operate on the top two elements of the stack (such as the 'add' instruction') would follow the convention that the top two elements on the stack were contained in registers rstk1 and rstk0 respectively, whereas within VM_3 the corresponding routines would assume that the top two stack elements were rstk2 and rstk1.

This can be illustrated by considering what the 'add' instruction would need to do in each of virtual machines VM_2 and VM_3:

| | |
|---|---|
| add_2: | # Add instruction in virtual machine 2 |
| rstk0 = rstk0 + rstk1 | # Add rstk0 and rstk1, result to rstk0 |
| virtual machine = VM 1 | # We have popped one element, switch virtual machine |
| add_3: | # Add instruction in virtual machine 3 |
| rstk1 = rstk1 + rstk2 | # Add rstk1 and rstk2, result to rstk1 |
| virtual_machine = VM_2 | # We have popped one element, switch virtual machine |

As will be seen, each operation, such as 'add', which has a net effect of popping data decrements the virtual machine number. Similarly, each operation which has a net effect of pushing data will increment the virtual machine number.

If the pseudo-code which is being run pushes more than N+1 values on to the stack, then there will be no more virtual machines available (and no more registers allocated to holding the stack elements). In this case, it will be necessary to spill elements to memory, and reset the current virtual machine accordingly. For efficiency, several elements would be spilled out, freeing up several virtual machines, so as to avoid having to spill again immediately. Usually the elements at the bottom of the stack would be spilled since these are least likely to be used again. For example, if there were 8 virtual machines denoted VM_0 to VM_7, then a routine in VM_7 which needed to push an item on to the stack might move 4 registers to memory, and switch to VM_3. Equally, a routine in VM_0 (such as 'add_0') which needed to pop an element from the stack would recover elements from memory into registers before proceeding, or give an error if no stack elements had previously been spilled out to memory. Provided there were enough virtual machines available to handle the stack depths commonly encountered, such spill and recover operations would occur rarely and would thus not have a serious effect on performance. In fact, much code in real-world examples would hardly ever exceed a stack depth of 8, so that nearly all operations would take place directly on registers.

A typical embodiment of this invention would be a Java byte-code interpreter module (which for simplicity of explanation is restricted to handling Java integer operations only), and which is designed to run on a standard RISC processor such as a PowerPC™. For each virtual machine in the array of N+1 virtual machines, there would be either a table of addresses of handlers (one for each possible instruction code of the pseudo-code), or alternatively the handlers themselves would be arranged in memory so that they were each of a fixed size. This is shown in FIG. 2. In this case there are 256 possible codes and 8 virtual machines. The appropriate handler address corresponding to a particular operation can then be obtained by using the value of the pseudo-code as an index into the table or the set of handlers. By laying out the tables (or sets of handlers) for each virtual machine contiguously in memory, and dedicating a register (denoted rdisp) to point at the table (or set of handlers) for the virtual machine corresponding to the current stack position, it will be possible to switch rapidly from one virtual machine to another simply by adding or subtracting multiples of the table size (or size of the set of handlers) to rdisp.

Suppose each handler in each viral machine is made exactly 16 bytes long, that is four PowerPC instructions. It is padded with nops at the end if it is shorter, and must end by branching to continuation code if it is too big. Since there are 256 possible Java byte-code values, this means that the set of handlers for each of the virtual machines has a fixed size, VMSIZE, of 16 times 256=4096 bytes. The handlers are laid out consecutively in memory starting with the handler for byte code 0 in VM_0, followed by the handler for byte code 1 in VM_0, and so on, up to the handler for byte code 255 in VM_7 (see FIG. 2).

In order to select the appropriate handler to execute a given instruction in a given virtual machine, a simple dispatch mechanism can be used. In this example of PowerPC assembler code, the register rdisp points to the base of the set of handlers (i.e. the handler for byte code 0) for the virtual machine currently being used. Register rpc points to the next Java byte code to be executed, and rtemp is a general-purpose register used to hold temporary values:

```
dispatcher_loop:
    lbz    rtemp,0(rpc)        # Get next byte code
    addi   rpc,rpc,1           # Increment PC for next time
    slwi   rtemp,rtemp,4       # Multiply byte code by 16
    add    rtemp,rtemp,rdisp   # Get address of handler, e.g.
                                 VM2_iadd
    mtctr  rtemp               # Put handler address in CTR register
    bctr                       # Branch to address in CTR register
```

Changing the virtual machine—and hence the implicit stack top—is then a case of simply modifying rdisp to point to a different virtual machine. For example, if an instruction popped two elements it would need to subtract twice VMSIZE from the rdisp register (if necessary calling a routine to reload the registers from memory if the stack had been partially spilt out to memory as described above). Each of the handler routines would end by branching back to dispatcher_loop to run the next Java instruction.

Thus, as an example, the handler for the Java "iadd" instruction (which adds the two elements at the top of the stack in the same way as described above, effectively popping one element) could be implemented in different virtual machines as follows:

Handler for "iadd" in Virtual Machine 2, with the top stack element in rstk1 and the second in rstk0:

```
VM2_iadd:                              # iadd for virtual machine 2
    add    rstk0,rstk1,rstk0           # rstk0 = rstk0 + rstk1
    subi   rdisp,rdisp,VMSIZE          # top stack element now in rstk0
    b      dispatcher_loop             # so next instruction will use VM_1
    nop                                # padding to ensure handler is 16
                                         bytes
```

Handler for "iadd" in Virtual Machine 3, with the top stack element in rstk2 and the second in rstk1:

```
VM3_iadd:                              # iadd for virtual machine 3
    add    rstk1,rstk2,rstk1           # rstk1 = rstk1 + rstk2
    subi   rdisp,rdisp,VMSIZE          # top stack element now in rstk1
    b      dispatcher_loop             # so next instruction will use VM_2
    nop                                # padding to ensure handler is 16
                                         bytes
... etc ...
```

Where (as is the case with Java byte code) there are different types of data which can be placed on the stack, such as integers and floating-point values, the technique of using multiple virtual machines as described above can be extended by using floating-point registers to hold floating-point values and general-purpose registers to hold integer values.

The technique described can also be used in a more sophisticated implementation which compiles the pseudo-code just before it is run. In such an implementation, fragments of code for each virtual machine (or templates enabling the appropriate code sequences to be very efficiently generated just before they are run) would be used to write out machine code which would then be directly executed rather than interpreted one at a time. This provides much higher performance for code which loops, since it is not necessary to re-interpret the pseudo-code each time the loop is executed.

What is claimed is:

1. A method of carrying out computer operations on a computer including a processor and a series of register, the method comprising:

constructing a series of program sections, each program section comprising an interpreter program which runs on the processor and interprets intermediate code, each program section being constructed to consider the series of registers as all or part of a stack for holding operands and each program section arranged to consider a different one of the series of registers to be at the top of the stack; and switching from one program section to another to perform pushes and pops of operands into and from the registers as a function of the register that is at the top of the stack, whereby, when an operand is pushed by a program section into the register which it considers to be at the top of the stack, a subsequent program section in the series is selected which considers a different register to be at the top of the stack, and when an operand is popped by a program section from the register which it considers to be at the top of the stack, a previous program section in the series is selected which considers a different register to be at the top of the stack.

2. A method according to claim 1, wherein each of the program section considers the series of registers to be in a common sequence.

3. A method according to claim 2, wherein each program section considers a different register to be at the top of the stack.

4. A method according to claim 3, wherein the switching from one program section to another is arranged such that the series of program sections are ordered so that the register considered to be at the top of the stack is in the same sequence as the sequence of program sections.

5. A method according to claim 2, wherein the switching from one program section to another can move the top of the stack by two or more registers where two or more operands are pushed or popped.

6. A method according to claim 3, wherein the switching from one program section to another can move the top of the stack by two or more registers where two or more operands are pushed or popped.

7. A method according to claim 4, wherein the switching from one program section to another can move the top of the stack by two or more registers where two or more operands are pushed or popped.

8. A method according to claim 1, wherein the program section are constructed to be identical, other than the register which is considered to be at the top of the stack.

9. A method according to claim 1, wherein the program section are constructed by writing intermediate code interpreter programs to a memory of a computer.

10. A method according to claim 1, wherein the same number of program section are constructed as there are registers, each virtual machine considering a different one of the registers to be at the top of the stack.

11. A method according to claim 1, further comprising the spilling of one or more operands from the stack into memory when more operands are pushed on to the stack than there are registers.

12. A method according to claim 9, wherein the spilled operands are taken from the bottom of the stack.

13. A method according to claim 11, wherein more than one operand is spilled to memory when more operands are pushed onto the stack than there are registers.

14. A method according to claim 12, wherein more than one operand is spilled to memory when more operands are pushed onto the stack than there are registers.

15. A method according to claim 13, wherein between 25 and 50% of the operands held in the registers are spilled to memory when more operands are pushed onto the stack than there are registers.

16. A method according to claim 1, further comprising the conversion of all instructions into machine code before the running of the computer.

17. A method according to claim 1, further comprising the conversion of instructions into machine code immediately before an instruction is run.

18. A computer comprising:
a processor;
a series of registers;
a series of program sections, each program section including an interpreter program which runs on the processor to interpret intermediate code, each program section being arranged to consider the series of registers as all or part of a stack for holding operands and to consider a different one of the series of registers to be at the top of the stack; and
switching means for switching from one program section to another whereby when an operand is pushed by a program section into the register which it considers to be at the top of the stack, the subsequent program section in series is selected by the switching means which considers a different register to be at the top of the stack, and when an operand is popped by a program section from the register which it considers to be at the top of the stack, the previous machine in the series is selected by the switching means which considers a different register to be at the top of the stack.

19. A method of carrying out computer operations on a computer including a processor and a series of register, the method comprising:
constructing a series of program sections, each program section comprising an interpreter program which runs on the processor and interprets intermediate code, each program section being constructed to consider the series of registers as all or part of a stack for holding operands and each program section arranged to consider a different one of the series of registers to be at the top of the stack; and
switching from one program section to another to perform pushes and pops of operands into and from the registers as a function of the register that is at the top of the stack without normally copying data into the registers.

20. A method of carrying out computer operations on a computer including a processor and a series of register, the method comprising:
constructing a series of program sections, each program section comprising an interpreter program which runs on the processor and interprets intermediate code, each program section being constructed to consider the series of registers as all or part of a stack for holding operands, and each program section arranged to consider a different one of the series of registers to be at the top of the stack;
the series of program sections being ordered in the same sequence as the sequence of the registers that are considered to be at the top of the stack of the program sections; and
switching from one program section to another to perform pushes and pops of operands into and from the registers as a function of the register that is at the top of the stack.

21. A method of interpreting an operation code which requires use of a register resource, on a computing system comprising a processor having at least first and second registers, and a memory, the method comprising:
creating a first interpreter module which, when executed by said processor, interprets said operation code using said first register as said register resource;
creating a second interpreter module which, when executed by said processor, interprets said operation code using said second register as said register resource;
storing said first and second interpreter modules in said memory; and
selecting for execution by said processor in the interpretation of said operation code:
said first interpreter module, if said first register is available for use as said first resource; but said second interpreter module, otherwise.

22. A computing system which interprets an operation code requiring use of a register resource, the computing system comprising:
a processor having at least first and second registers;
a memory having stored therein:
a first interpreter module which, when executed by said processor, interprets said operation code using said first register as said register resource; and
a second interpreter module which, when executed by said processor, interprets said operation code using said second register as said register resource;
wherein the processor selects for execution in the interpretation of said operation code:
said first interpreter module, if said first register is available for use as said first resource; but said second interpreter module, otherwise.

* * * * *